(12) United States Patent
Nakashima et al.

(10) Patent No.: US 9,702,308 B2
(45) Date of Patent: Jul. 11, 2017

(54) DIESEL ENGINE AND METHOD FOR CONTROLLING DIESEL ENGINE

(75) Inventors: Mitsuru Nakashima, Oyama (JP); Tadashi Iijima, Yuuki (JP); Kaoru Sakurai, Oyama (JP); Kouichi Okaya, Oyama (JP); Takashi Sakasai, Kasukabe (JP)

(73) Assignee: Komatsu Ltd., Tokyo (JP)

( * ) Notice: Subject to any disclaimer, the term of this patent is extended or adjusted under 35 U.S.C. 154(b) by 148 days.

(21) Appl. No.: 14/366,478

(22) PCT Filed: Sep. 13, 2012

(86) PCT No.: PCT/JP2012/073546
§ 371 (c)(1),
(2), (4) Date: Mar. 19, 2015

(87) PCT Pub. No.: WO2013/161097
PCT Pub. Date: Oct. 31, 2013

(65) Prior Publication Data
US 2015/0219029 A1 Aug. 6, 2015

(30) Foreign Application Priority Data
Apr. 25, 2012 (JP) ................................. 2012-100429

(51) Int. Cl.
*F02D 41/00* (2006.01)
*F02D 41/14* (2006.01)
(Continued)

(52) U.S. Cl.
CPC ..... *F02D 41/0052* (2013.01); *F02D 41/0065* (2013.01); *F02D 41/0072* (2013.01);
(Continued)

(58) Field of Classification Search
CPC . Y02T 10/47; F02D 41/0052; F02D 41/0065; F02D 41/1461; F02D 41/18; F02D 41/1462; F02D 41/0072; F02D 41/2474
See application file for complete search history.

(56) References Cited

U.S. PATENT DOCUMENTS 5,636,614 A 6/1997 Morikawa
5,918,582 A * 7/1999 Itoyama ................ F02M 26/57
123/480

(Continued)

FOREIGN PATENT DOCUMENTS

JP 07-208272 A 8/1995
JP 10-252573 A 9/1998

(Continued)

OTHER PUBLICATIONS

International Search Report dated Dec. 18, 2012, issued for PCT/JP2012/073546.

*Primary Examiner* — Hieu T Vo
*Assistant Examiner* — Sherman Manley
(74) *Attorney, Agent, or Firm* — Locke Lord LLP

(57) ABSTRACT

A diesel engine, includes: an exhaust gas recirculation device that recirculates an exhaust gas emitted from the diesel engine to an intake side of the diesel engine; an intake air amount sensor that measures an intake air amount of the diesel engine; a NOx measurement sensor that measures NOx contained in the exhaust gas emitted from the diesel engine; and a control device that obtains a correction value for correcting a measured value by the intake air amount sensor based on a difference between first information on NOx obtained based on information on a rotation speed of the diesel engine and information on a load and second information on NOx measured by the NOx measurement sensor to control the exhaust gas recirculation device based (Continued)

on the measured value by the intake air amount sensor corrected using the correction value.

10 Claims, 7 Drawing Sheets

(51) Int. Cl.
    *F02D 41/18*     (2006.01)
    *F02D 41/24*     (2006.01)
    *F02M 26/15*     (2016.01)

(52) U.S. Cl.
    CPC ..... *F02D 41/1461* (2013.01); *F02D 41/1462* (2013.01); *F02D 41/18* (2013.01); *F02D 41/2474* (2013.01); *F02M 26/15* (2016.02); *Y02T 10/47* (2013.01)

(56) References Cited

U.S. PATENT DOCUMENTS

| | | | |
|---|---|---|---|
| 2002/0104309 A1* | 8/2002 | Nishiyama | F01N 3/0842 60/278 |
| 2008/0202118 A1* | 8/2008 | Ide | F02D 41/0052 60/605.2 |
| 2015/0225927 A1* | 8/2015 | Hoshino | F02D 29/02 701/50 |

FOREIGN PATENT DOCUMENTS

| | | |
|---|---|---|
| JP | 11-236857 A | 8/1999 |
| JP | 11-257053 A | 9/1999 |
| JP | 2000-282958 A | 10/2000 |
| JP | 2004-092471 A | 3/2004 |
| JP | 2008-069690 A | 3/2008 |
| JP | 2011-047377 A | 3/2011 |

* cited by examiner

FIG.4

| MAF_R | Ctab |
|---|---|
| MAF_R1 | Ctab1 |
| MAF_R2 | Ctab2 |
| ⋮ | ⋮ |
| MAF_Rm | Catbm |

|  | N1 | N2 | ... | Nj |
|---|---|---|---|---|
| FS1 | NOx_11 | NOx_12 | ... | NOx_1j |
| FS2 | NOx_21 | NOx_22 | ... | NOx_2j |
| ⋮ | ⋮ | ⋮ | ... | ⋮ |
| FSi | NOx_i1 | NOx_i2 | ... | NOx_ij |

| J | MAF_R | kp | ki | kd |
|---|---|---|---|---|
| 1 | MAF_R1 | kp1 | ki1 | kd1 |
| 2 | MAF_R2 | kp2 | ki2 | kd2 |
| 3 | MAF_R3 | kp3 | ki3 | kd3 |
| ⋮ | ⋮ | ⋮ | ⋮ | ⋮ |
| n-1 | MAF_Rn-1 | kpn-1 | kin-1 | kdn-1 |
| n | MAF_R_n | kpn | kin | kdn |

DIESEL ENGINE AND METHOD FOR CONTROLLING DIESEL ENGINE

FIELD

The present invention relates to a diesel engine including a sensor for measuring an intake air amount and a device for recirculating an exhaust gas, and a method for controlling the same.

BACKGROUND

A diesel engine performs so-called EGR (exhaust gas recirculation) to return an exhaust gas to the air-intake side to reduce the amount of NOx (nitrogen oxides) contained in the exhaust gas. To recirculate the exhaust gas to the air-intake side, the intake air amount of the diesel engine is required to determine the EGR rate. To measure the intake air amount of the diesel engine, a MAF (mass air flow) sensor is used (for example, refer to Patent Literature 1).

CITATION LIST

Patent Literature

Patent Literature 1: Japanese Unexamined Patent Application No. 2011-47377

SUMMARY

Technical Problem

The MAF sensor may not be capable of measuring the correct intake air amount due to individual variation, temporal change, or the like. In this case, it is necessary to correct the MAF sensor such that readout of the MAF sensor and an actual intake air amount coincide with each other. According to the technique disclosed in Patent Literature 1, when the engine is in a state in which learning execution conditions are met, the measured air amount based on the readout of the MAF sensor is corrected using the relationship between a logical air amount estimated from the engine state and readout of the MAF sensor.

As described above, the MAF sensor is used for general control of a diesel engine including EGR, and EGR is performed to reduce NOx contained in an exhaust gas emitted from the diesel engine. According to the technique disclosed in Patent Literature 1, it is desired that the opening of an EGR valve is below a set value or the EGR valve is fully closed as a learning execution condition. However, the EGR valve is fully closed under limited situations, and it is thus difficult to employ EGR directly to all diesel engines. The measured air amount based on readout of the MAF sensor is corrected without taking EGR into account, and therefore, when EGR is conducted using the corrected measured air amount, there is a possibility that NOx contained in exhaust gas cannot be completely reduced.

An object of the present invention is to provide a diesel engine in which EGR is controlled using a measured value from a MAF sensor for measuring intake air amount, wherein the measured value from the MAF sensor is corrected by NOx contained in exhaust gas to improve the accuracy of EGR control and reduce NOx contained in the exhaust gas.

Solution to Problem

According to the present invention, a diesel engine, comprises: an exhaust gas recirculation device that recirculates an exhaust gas emitted from the diesel engine to an intake side of the diesel engine; an intake air amount sensor that measures an intake air amount of the diesel engine; a NOx measurement sensor that measures NOx contained in the exhaust gas emitted from the diesel engine; and a control device that obtains a correction value for correcting a measured value by the intake air amount sensor based on a difference between first information on NOx obtained based on information on a rotation speed of the diesel engine and information on a load and second information on NOx measured by the NOx measurement sensor to control the exhaust gas recirculation device based on the measured value by the intake air amount sensor corrected using the correction value.

In the present invention, it is preferable that the control device obtains the correction value until the difference reaches a predetermined value or less and repeats correction of the measured value.

In the present invention, it is preferable that when the difference reaches the predetermined value or less, after a timing when the difference reaches the predetermined value or less, the control device uses the correction value at the timing when the difference reaches the predetermined value or less to correct the measured value.

In the present invention, it is preferable that the correction value is obtained further based on the information on the rotation speed of the diesel engine and the information on the load.

In the present invention, it is preferable that at least when the diesel engine is operated in a steady state, the control device corrects the measured value based on the difference.

According to the present invention, a method for controlling a diesel engine including an intake air amount sensor that measures an intake air amount and an exhaust gas recirculation device that recirculates an exhaust gas to an intake side, the method comprises: obtaining a difference between first information on NOx determined based on information on a rotation speed of the diesel engine and information on a load and second information on NOx contained in the exhaust gas emitted from the diesel engine; obtaining a correction value for correcting a measured value by the intake air amount sensor based on the difference; correcting the measured value by the intake air amount sensor using the correction value; and controlling the exhaust gas recirculation device based on the corrected measured value.

In the present invention, it is preferable that the correction value is obtained until the difference reaches a predetermined value or less and correction of the measured value is repeated.

In the present invention, it is preferable that when the difference reaches the predetermined value or less, after a timing when the difference reaches the predetermined value or less, the correction value at the timing when the difference reaches the predetermined value or less is used to correct the measured value.

In the present invention, it is preferable that the correction value is obtained further based on the information on the rotation speed of the diesel engine and the information on the load.

In the present invention, it is preferable that at least when the diesel engine is operated in a steady state, the measured value is corrected based on the difference.

According to the present invention, it is possible to improve the accuracy of EGR control and reduce NOx contained in the exhaust gas in the diesel engine in which EGR is controlled using a measured value by the MAF sensor for measuring the intake air amount.

BRIEF DESCRIPTION OF DRAWINGS

FIG. 4 is a diagram illustrating one example of a MAF correction map for use in the method for controlling the diesel engine according to the embodiment.

FIG. 5 is a diagram illustrating one example of a NOx estimation map for use in the method for controlling the diesel engine according to the embodiment.

FIG. 8 is a diagram illustrating one example of a gain setting map for use in the method for controlling the diesel engine according to the modification example of the embodiment.

DESCRIPTION OF EMBODIMENTS

Modes for carrying out the present invention (embodiments) will be described in detail with reference to the drawings.

<Diesel Engine>

Figure 1:
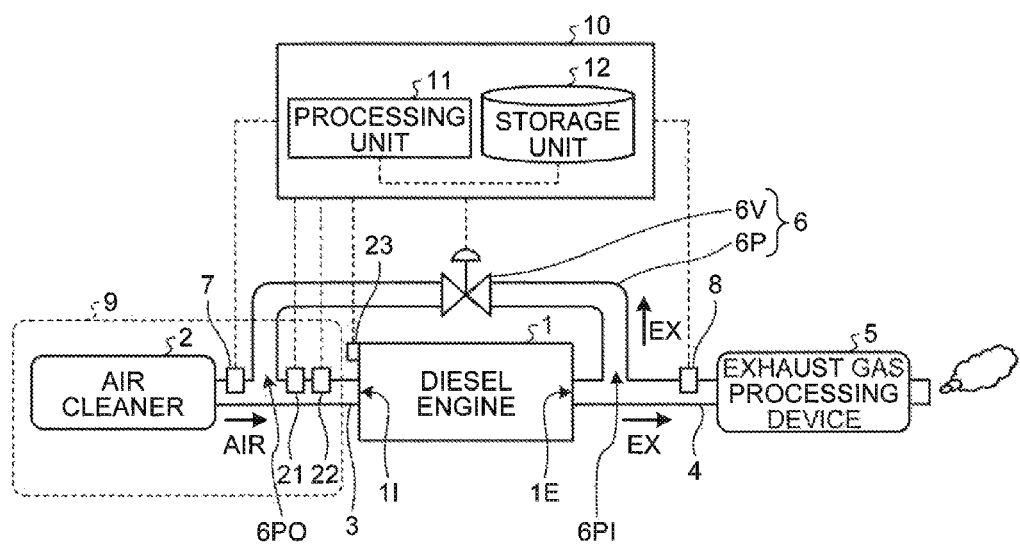
FIG. 1 is a schematic view of a diesel engine and a control device for the same according to an embodiment.

FIG. 1 is a schematic view of a diesel engine and a control device for the same according to an embodiment. A diesel engine 1 includes a control device 10, an exhaust gas recirculation (EGR) device 6, a MAF sensor (intake air amount sensor) 7, and a NOx measurement sensor 8. The diesel engine 1 is connected to an intake pipe 3 as an intake path and an exhaust pipe 4 as an exhaust path. An air cleaner 2 is attached to the inlet of the intake pipe 3 to remove dust in the air. An exhaust gas processing device 5 is attached to the exhaust pipe 4 to purify an exhaust gas emitted from the diesel engine 1.

The control device 10 may be a microcomputer unit, for example. The control device 10 includes a processing unit 11 and a storage unit 12. The processing unit 11 is a CPU (central processing unit), for example. The storage unit 12 is RAM (random access memory), ROM (read-only memory), EPROM (erasable programmable read-only memory), or EEPROM (electrically erasable programmable read-only memory) or the like, or a combination of the foregoing ones, for example. The processing unit 11 executes various kinds of control on the diesel engine 1, including a method for controlling the diesel engine according to the embodiment. The storage unit 12 stores computer programs for executing the various kinds of control and information required for the various kinds of control. When executing any of the various kinds of control, the processing unit 11 reads the foregoing computer program from the storage unit 12 and executes an instruction described in the program. When executing the foregoing various kinds of control, the processing unit 11 as necessary reads information required for control from the storage unit or acquires information on the state of the diesel engine 1 from various sensors such as the MAF sensor 7 and the NOx measurement sensor 8.

The EGR device 6 is configured to return a portion of exhaust gas EX emitted from the diesel engine 1 to an air-intake side, more specifically, to the intake pipe 3. The EGR device 6 includes an exhaust gas return pipe 6P as an exhaust gas return path, and an EGR valve 6V as a recirculation amount adjustment device that is provided to the exhaust gas return pipe 6P for opening and closing of the exhaust gas return pipe 6P. The exhaust gas return pipe 6P has an inlet 6PI opened to the exhaust pipe 4 between an exhaust opening 1E of the diesel engine 1 and the NOx measurement sensor 8, and an outlet 6PO opened to the intake pipe 3 between the MAF sensor 7 and an intake opening 11 of the diesel engine. The EGR valve 6V is configured to open or close the exhaust gas return pipe 6P and change the path cross section area. The EGR valve 6V is changed in opening to adjust the amount of the exhaust gas EX recirculated to the intake pipe 3 (recirculation amount). The EGR valve 6V is controlled in operation by the control device 10.

In the embodiment, a turbo charger is not essential to the diesel engine 1. When the diesel engine 1 includes a turbo charger, the inlet 6PI of the exhaust gas return pipe 6P is opened to the exhaust pipe 4 between the exhaust opening 1E of the diesel engine 1 and a turbine inlet of the turbo charger. The outlet 6PO of the exhaust gas return pipe 6P is opened to the intake pipe 3 between the air intake opening 11 of the diesel engine 1 and an outlet of an after cooler for cooling the air having passed through a compressor of the turbo charger.

The MAF sensor 7 measures the flow rate of air AIR passing through the intake pipe 3 and taken in by the diesel engine 1 (intake air amount, in the embodiment, mass flow rate). In the embodiment, the air cleaner 2, the MAF sensor 7, and the intake pipe 3 constitutes a MAF system 9. The MAF sensor 7 is disposed at the intake pipe 3, more specifically, between the air cleaner 2 and the outlet 6PO of the exhaust gas return pipe 6P. The MAF sensor 7 is electrically connected to the control device 10. By the foregoing structure, a measured value from the MAF sensor 7 is acquired by the control device 10. The control device uses the measured value from the MAF sensor 7 for control of the diesel engine 1, including control of the EGR device 6. The MAF sensor 7 measures the intake air amount of the diesel engine 1 for use in control of the EGR device 6 such that NOx contained in the exhaust gas EX falls below a regulatory limit.

The NOx measurement sensor 8 measures NOx contained in the exhaust gas EX emitted from the diesel engine 1. The NOx measurement sensor 8 is disposed at the exhaust pipe 4, more specifically, between the inlet 6PI of the exhaust gas return pipe 6 and the exhaust gas processing device 5. The NOx measurement sensor 8 is electrically connected to the control device 10. By the foregoing structure, a measured value from the NOx measurement sensor 8 is acquired by the control device 10. The control device 10 uses the measured value from the NOx measurement sensor 8 for control of the diesel engine 1 mainly including control of the EGR device 6.

The exhaust gas processing device 5 is configured to purify the exhaust gas EX from the diesel engine 1, and mainly reduce NOx in the exhaust gas EX. The exhaust gas processing device 5 includes a DPF (diesel particulate filter) and a urea SCR (selective catalysis reactor), for example. In this embodiment, however, the exhaust gas processing device 5 is not limited to this configuration.

The intake pipe 3 is provided with an intake air pressure sensor 21 and an intake air temperature sensor 22 to measure the pressure (intake air pressure) and the temperature (intake air temperature) of the air AIR passing through the intake pipe 3. The intake air pressure sensor 21 and the intake air temperature sensor 22 are disposed between the outlet 6PO of the exhaust gas return pipe 6P and the intake inlet 1I of the diesel engine 1. Alternatively, the intake air pressure sensor 21 and the intake air temperature sensor 22 may be disposed at an intake manifold not illustrated. The intake air pressure sensor 21 and the intake air temperature sensor 22 are electrically connected to the control device 10. By the foregoing structure, measured values from the intake air pressure sensor 21 and the intake air temperature sensor 22 are acquired by the control device 10. The diesel engine 1 also has an engine speed sensor 23 to measure the rotation speed of a crank shaft of the diesel engine 1 (called as appropriate engine rotation speed). The engine rotation speed refers to engine speed per unit time. The control device 10 uses measured values from the intake air pressure sensor 21, the intake air temperature sensor 22, and the engine speed sensor 23 for control of the diesel engine 1 mainly including control of the EGR device 6. Next, control of the EGR device 6 will be described.

<Control of EGR Device>

When controlling the EGR device 6, the control device controls the recirculation amount of the exhaust gas EX (EGR gas amount) according to the operating conditions of the diesel engine 1. In this case, the recirculation amount of the exhaust gas EX is decided based on the EGR rate. A target value for the EGR rate is determined in advance from the engine rotation speed and load (equivalent to fuel injection amount) such that NOx contained in the exhaust gas EX falls below a regulatory limit. The EGR rate is expressed as in equation (1). The entire intake air amount included in the EGR rate is expressed as in equation (2). The entire intake air amount can be determined from the pressure and temperature of the air AIR passing through the intake pipe 3. The former is measured by the intake air pressure sensor 21, and the latter is measured by the intake air temperature sensor 22. The intake air amount in the equation (2) is measured by the MAF sensor 7.

EGR rate=EGR gas amount/entire intake air amount (1)

Entire intake air amount=EGR gas amount+intake air amount (2)

The target value for the EGR rate is decided in advance in correspondence with the rotation speed and the load of the engine, and is stored as a map associated with the two in the storage unit 12 of the control device 10. When controlling the EGR device 6 during operation of the diesel engine 1, the control device 10 controls the EGR gas amount such that a difference between the target value for the EGR rate corresponding to the engine rotation speed and the load and the measured value of the EGR rate determined by the equation (1) becomes 0. When controlling the EGR gas amount, the control device 10 controls the EGR device 6, more specifically, the opening of the EGR valve 6V.

There are individual variations in the air cleaner 2, the MAF sensor 7, and the intake pipe 3 included in the MAF system 9. The MAF sensor 7 also changes over time. By these variations and temporal changes, there occurs a difference between the measured value from the MAF sensor 7 and the actual intake air amount. If there occurs a difference between the two, when the recirculation amount of the exhaust gas EX is controlled based on the target value for the EGR rate specified by the control device 10 based on the engine rotation speed and the load and the EGR rate based on the intake air amount measured by the MAF sensor 7 (the measured value of the EGR rate), there occurs a difference between the foregoing target value for the EGR rate and the actual EGR rate based on the actual intake air amount. As a result, when the EGR valve 6V is controlled based on the target value for the EGR rate and the measured value of the EGR rate (based on the measured value of the MAF sensor 7), there is a possibility that a gap occurs between the actual NOx amount contained in the exhaust gas EX emitted from the diesel engine 1 and the NOx amount based on the target value for the EGR rate.

For example, when the intake air amount measured by the MAF sensor 7 is smaller than the actual intake air amount, if the entire intake air amount is correct, it is numerically determined that a large amount of EGR gas flows. Accordingly, in the foregoing control logic of the EGR device 6, the EGR rate becomes excessively larger than an ideal value, that is, the target value for the EGR rate. The control device 10 thus controls and closes the EGR valve 6V to reduce the EGR gas amount to return the EGR rate to the target value. As a result, the EGR gas amount becomes smaller than an originally required amount and the amount of NOx contained in the exhaust gas of the diesel engine 1 increases.

The foregoing gap between the actual NOx amount and the NOx amount based on the target value for the EGR rate results from an error in the measured value from the MAF sensor 7. Thus, it is necessary to correct the measured value from the MAF sensor 7 such that the measured value from the MAF sensor 7 and the actual intake air amount coincide with each other. It is the amount NOx contained in the exhaust gas EX that is to be handled to allow NOx to fall below the regulatory limit. Taking note of this respect, according to the method for controlling the diesel engine according to the embodiment, if there exists a difference between the measured value from the NOx measurement sensor 8 and the estimated value of NOx determined from operating conditions of the diesel engine 1, it is regarded that the difference results from an error in the measured value from the MAF sensor 7. Therefore, in the method for controlling the diesel engine according to the embodiment, if there exists the foregoing difference, this means that the measured value from the MAF sensor 7 has an error, and thus the measured value from the MAF sensor is corrected such that the foregoing difference becomes 0. Next, the method for controlling the diesel engine according to the embodiment will be described.

<Method for Controlling the Diesel Engine>

Figure 2:
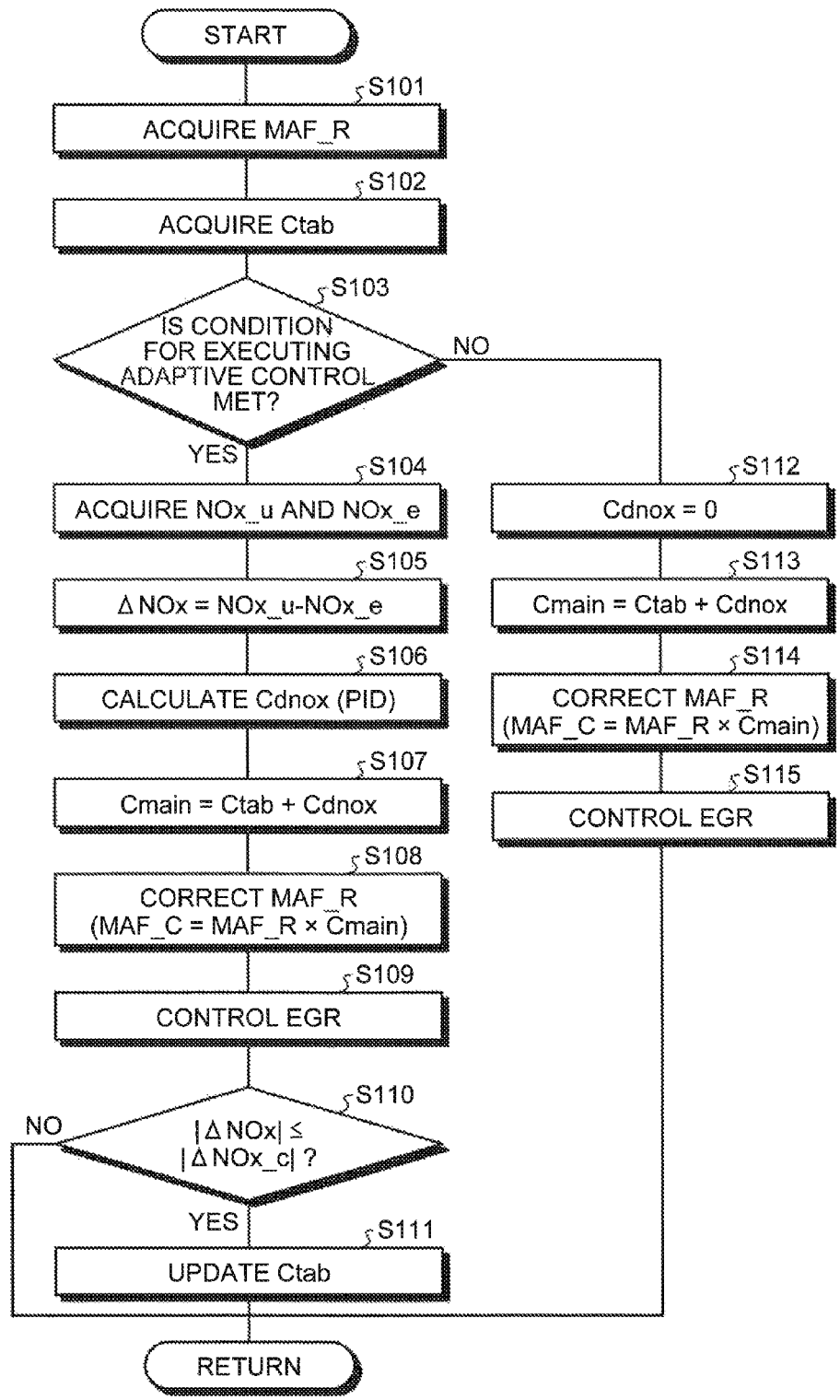
FIG. 2 is a process flowchart of a method for controlling the diesel engine according to the embodiment.
Figure 3:
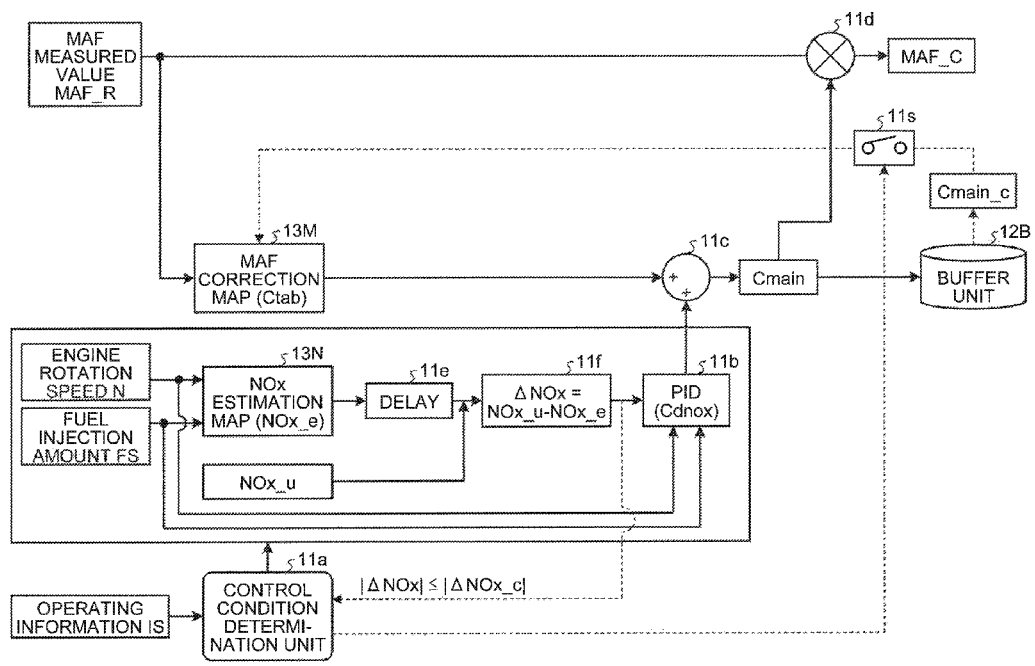
FIG. 3 is a control block diagram of the diesel engine according to the embodiment.
Figure 6:
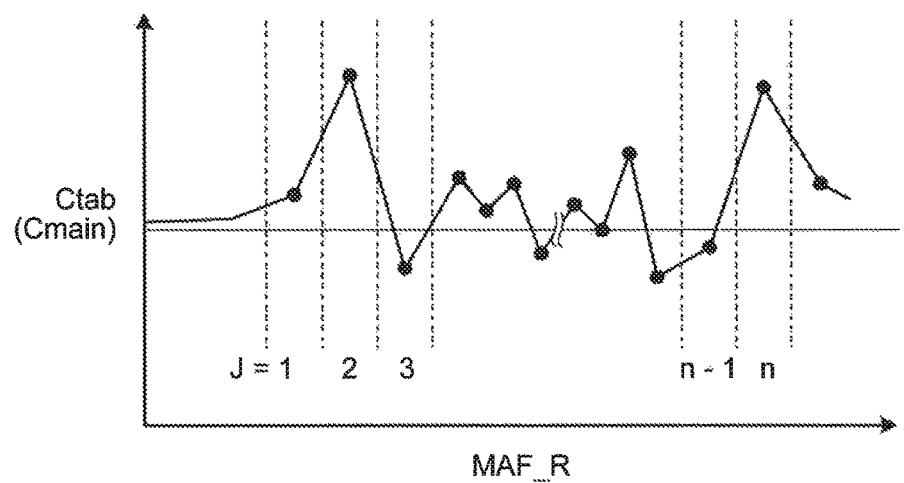
FIG. 6 is a diagram illustrating the relationship between map correction values described in the MAF correction map and MAF measured values.

FIG. 2 is a process flowchart of the method for controlling the diesel engine according to the embodiment. FIG. 3 is a control block diagram of the diesel engine according to the embodiment. FIG. 4 is a diagram illustrating one example of a MAF correction map for use in the method for controlling the diesel engine according to the embodiment. FIG. 5 is a diagram illustrating one example of a NOx estimation map for use in the method for controlling the diesel engine according to the embodiment. FIG. 6 is a diagram illustrating the relationship between map correction values described in the MAF correction map and MAF measured values. The method for controlling the diesel engine according to the embodiment is realized by the control device 10 illustrated in FIG. 1. In the following description, the method for controlling the diesel engine according to the embodiment will be referred to as appropriate as adaptive control.

At step S101, the processing unit 11 of the control device 10 acquires a measured value measured by the MAF sensor 7 (MAF measured value) MAF_R from the MAF sensor 7 illustrated in FIG. 1. Next, the processing unit 11 moves to step S102 to provide the MAF measured value MAF_R acquired at step S101 to a MAF correction map 13M read from the storage unit 12 illustrated in FIG. 1 to acquire a corresponding map correction value Ctab.

The initial value of the map correction value Ctab (at the time of shipment of the diesel engine 1 and the control device 10 or at the time of resetting of the control device 10) is 1. The map correction value Ctab is acquired by the processing unit 11 from the MAF correction map 13M illustrated in FIG. 3. Prepared in the MAF correction map 13M are map correction values Ctab corresponding to a plurality of MAF measured values MAF_R measured by the MAF sensor 7, for example. Then, the MAF correction map 13M describes the MAF measured values MAF_R1, MAF_R2, and others and the map correction values Ctab1, Ctab2, and others corresponding to the measured values. The MAF measured values MAF_R1, MAF_R2, and others are mass flow rates. The MAF correction map 13M of the embodiment describes m map correction values Ctab corresponding to m MAF measured values MAF_R. The number of the values is not limited to m. The MAF correction map 13M is stored in the storage unit 12 of the control device 10 illustrated in FIG. 1.

The intake air amount measured by the MAF sensor 7 during operation of the diesel engine 1 has a certain range and varies within the range as illustrated in FIG. 6. For example, the intake air amount measured by the MAF sensor 7 is divided into a plurality of sections of a predetermined size and the map correction values Ctab are prepared for the sections, as illustrated in FIG. 6. The initial values of the map correction values Ctab prepared for the sections are 1.

Next, the processing unit 11 moves the process to step S103. At step S103, a control condition determination unit 11a illustrated in FIG. 3 determines whether there is any condition for executing the adaptive control. In the embodiment, the processing unit 11 of the control device 10 illustrated in FIG. 1 realizes the function of the processing unit 11. The control condition determination unit 11a acquires information IS on operating conditions and status of the diesel engine 1 (operating information), and determines whether there exists any condition for executing the adaptive control based on the information. Next, this determination will be described.

<Conditions for Executing the Adaptive Control>

In the embodiment, there is at least a condition for executing the adaptive control that the diesel engine 1 is under operation in a steady state (steady operation) (first condition). Additional conditions may be included as follows: the diesel engine 1 is normally functional (second condition); the NOx measurement sensor 8 is normally functional (third condition); the correction of the MAF measured value MAF_R is enabled (fourth condition); and the like. In the embodiment, the adaptive control is executed when all of the first to fourth conditions are met, but the present invention is not limited to this.

Under the first condition, the case where the diesel engine 1 not in the steady state is excluded from the target of the adaptive control, for example. This is because the NOx estimated values NOx_e described in a NOx estimation map 13N illustrated in FIG. 3 and others are based on the premise that the diesel engine 1 is in the steady state. In general, the acceleration, deceleration, and the like of the diesel engine 1 are classified as transient states. However, when the diesel engine 1 is under acceleration or deceleration but the fuel injection amount is stable, for example, the diesel engine 1 may be considered as being in the stead state. In addition, in the embodiment, operations at high altitudes or operations at extremely low temperatures, such as forced regeneration of DPF included in the exhaust gas processing device 5, are classified as non-steady states. However, even in the foregoing states, the diesel engine 1 may be regarded as being in the steady state by preparing the NOx estimation map 13N that describes the NOx estimated values NOx_e corresponding to those conditions.

Under the second condition, the case where the diesel engine 1 is in abnormal state is excluded from the target of the adaptive control. This is because the NOx estimated values NOx_e described in the NOx estimation map 13N illustrated in FIG. 3 and others are based on the premised that the diesel engine 1 is in normal state. The second condition is met when there is no error in the diesel engine 1, for example.

Under the third condition, the case where the NOx measurement sensor 8 in in abnormal state is excluded from the target of the adaptive control. This is because, in the embodiment, the MAF measured value MAF_R is corrected using the measured value from the NOx measurement sensor 8. The second condition is met when no abnormality is detected in the NOx measurement sensor 8, for example.

Under the fourth condition, the case where the correction of the MAF measured value MAF_R is disabled such as in the case where no EGR is carried out, or the case where the correction of the MAF_R measured value is enabled but the high accuracy of the correction cannot be expected because of lower sensitivity of the NOx measurement sensor 8, is excluded from the conditions for the adaptive control. Since the correction of the MAF measured value MAF_R is needed for control of the EGR device 6, when the EGR valve 6V is fully closed, for example, EGR is not carried out and thus this case is excluded from the conditions for the adaptive control. In addition, when the EGR valve 6V is fully opened and the NOx estimated value NOx_e is larger than the measured value from the NOx measurement sensor 8, it is considered that some abnormality has occurred, and thus this case is excluded from the conditions for the adaptive control. Further, when the diesel engine 1 is operated with low load, a large amount of oxygen is contained in the air taken in the diesel engine 1 and the effect of EGR is small, and thus this case is excluded from the conditions for the adaptive control.

The control condition determination unit 11a illustrated in FIG. 3 acquires operating information IS, and based on this, determines whether all of the first to fourth conditions are met. The operating information includes, for example, atmospheric pressure, atmospheric temperature, the ratio of change in the engine rotation speed, the ratio of change in the fuel injection amount, coolant temperature, intake air temperature, intake air pressure, the presence or absence of an error, and the like. These items can be obtained from various sensors in the diesel engine 1, control information in the control device 10, and the like.

As described above, in the embodiment, the correction of the MAF measured value MAR_R is executed based on a difference ΔNOx at least under the condition that the diesel engine 1 is under steady operation. Accordingly, the accuracy of the correction of the MAF measured value MAF_R is improved. Next, descriptions will be given as to the case where it is determined at step S103 that the condition for executing the adaptive control is met (step S103: Yes).

When the condition for executing the adaptive control is met (step S103: Yes), the processing unit 11 moves the process to step S104. At step S104, the processing unit 11 determines the estimated value of NOx (NOx estimated value) NOx_e.

The NOx estimated value NOx_e is acquired by the processing unit 11 from the NOx estimation map 13N illustrated in FIG. 5. The NOx estimation map 13N describes a plurality of NOx estimated values NOx_e11 to NOx_eij in correspondence with a plurality of engine rotation speeds N1 to Ni and a plurality of fuel injection amounts FS1 to FSj, as illustrated in FIG. 5, for example. The NOx estimation map 13N is stored in the storage unit 12 of the control device 10 illustrated in FIG. 1. As a load on the diesel engine 1, torque of the diesel engine may be used instead of the fuel injection amount FS to determine the NOx estimated value NOx_e from the engine rotation speed and the torque.

At step S104, the processing unit 11 acquires engine rotation speed N measured by the engine speed sensor 23 illustrated in FIG. 1 and the fuel injection amount FS for the diesel engine 1, and gives the same to the NOx estimation map 13N read from the storage unit 12 illustrated in FIG. 1 to acquire the corresponding NOx estimated value NOx_e. The processing unit 11 also acquires the measured value of NOx (NOx measured value) NOx_u measured by the NOx measurement sensor 8 illustrated in FIG. 1. Then, the processing unit 11 moves the process to step S105. At step S105, the processing unit 11 determines the difference $\Delta NOx$ between the NOx estimated value NOx_e as first information on NOx determined based on the information on the engine rotation speed N and the fuel injection amount FS as information on load and the NOx measured value NOx_u as second information on NOx measured by the NOx measurement sensor. Specifically, a subtraction unit 11$f$ illustrated in FIG. 3 determines the difference $\Delta NOx$ between the measured value of NOx (NOx measured value) NOx_u measured by the NOx measurement sensor 8 illustrated in FIG. 1 and the NOx estimated value NOx_e output from a delay application unit 11$e$. The difference $\Delta NOx$ is expressed as in equation (3):

$$\Delta NOx = NOx\_u - NOx\_e \quad (3)$$

It is necessary to match the timing when the NOx measured value NOx_u is input into the subtraction unit 11$f$ to the timing when the NOx estimated value NOx_e is input into the subtraction unit 11$f$. There exists a delay in measurement by the NOx measurement sensor 8. Thus, the delay application unit 11$e$ illustrated in FIG. 3 applies a predetermined delay decided taking into account the delay in measurement by the NOx measurement sensor 8 to the NOx estimated value NOx_e, and then outputs the NOx estimated value NOx_e to the subtraction unit 11$f$. Accordingly, it is possible to match the timing when the NOx measured value NOx_u is input into the subtraction unit 11$f$ to the timing when the NOx estimated value NOx_e is input into the subtraction unit 11$f$, and achieve stable processing. The processing unit 11 realizes the functions of the delay application unit 11$e$ and the subtraction unit 11$f$.

Next, the processing unit 11 moves the process to step S106. A correction value generation unit 11$b$ illustrated in FIG. 3 receives the result of the determination by the control condition determination unit 11$a$ that the adaptive control condition is met, and thus determines a correction value Cdnox. In the embodiment, the processing unit 11 realizes the functions of the correction value generation unit 11$b$. The correction value Cdnox is equivalent to a correction value for correcting the measured value from the MAF sensor 7. The correction value Cdnox is determined by the correction value generation unit 11$b$ performing a PID process expressed in equation (4) on the difference $\Delta NOx$. The first term at the right side of the equation (4) is a proportional term, the second term at the right side of the same is an integral term, and the third term at the right side of the same is a derivative term. In the equation, kp denotes a proportional gain, ki denotes an integral gain, and kd denotes a derivative gain. The integral term $\Sigma(\Delta NOx)$ is reset to 0 when deviating from the adaptive control condition.

$$Cdnox = kp \times \Delta NOx + ki \times \Sigma(\Delta NOx) + kd \times d/dt(\Delta NOx) \quad (4)$$

In the embodiment, the proportional gain kp, the integral gain ki, and the derivative gain kd are prepared in correspondence with the operating conditions of the diesel engine 1. Specifically, a plurality of proportional gains kp, a plurality of integral gains ki, and a plurality of derivative gains kd are prepared in correspondence with a plurality of engine rotation speeds N1 to Ni and a plurality of fuel injection amounts FS1 to FSj. The correction value generation unit 11$b$ acquires the engine rotation speed N and the fuel injection amount FS, and determines the corresponding proportional gain kp, integral gain ki, and derivative gain kd. Then, the correction value generation unit 11$b$ gives the determined proportional gain kp, integral gain ki, and derivative gain kd to the equation (4) to determine the correction value Cdnox. The correction value Cdnox varies in proportion to the difference $\Delta NOx$, the integration of the difference $\Delta NOx$, and the differentiation of the difference $\Delta NOx$. As described above, the correction value Cdnox is determined using the proportional gains kp, integral gains ki, and derivative gains kd prepared based on the plurality of engine rotation speeds N and the plurality of fuel injection amounts FS. Therefore, the correction value Cdnox is determined based on the engine rotation speed N and the fuel injection amount FS.

The proportional gain kp, the integral gain ki, and the derivative gain kd may not correspond to the operating conditions of the diesel engine 1. For example, the proportional gain kp, the integral gain ki, and the derivative gain kd may constitute constants. Alternatively, at least one of the proportional gain kp, the integral gain ki, and the derivative gain kd may correspond to the operating conditions of the diesel engine 1. In addition, the correction value generation unit 11$b$ determines the correction value Cdnox by the proportional term, the integral term, and the derivative term, but alternatively, the correction value generation unit 11$b$ may determine the correction value Cdnox at least using the integral term. Further, by using at least one of the proportional term and the derivative term, it is possible to suppress reduction in accuracy of the intake air amount measured by the MAF sensor 7. As a result, it is possible to further improve the accuracy of the control of EGR.

Upon completion of step S106, the processing unit 11 moves the process to step S107. At step S107, the processing unit 11 determines a MAF correction coefficient Cmain. In this case, an addition unit 11$c$ adds up the map correction value Ctab acquired at step S102 and the correction value Cdnox determined at step S106. Therefore, the MAF correction coefficient Cmain is expressed as in equation (5). In the embodiment, the processing unit 11 realizes the function of the addition unit 11$c$.

$$Cmain = Ctab + Cdnox \quad (5)$$

Next, the processing unit 11 moves the process to step S108. At step S108, a multiplication unit 11$d$ illustrated in FIG. 3 corrects the MAF measured value MAF_R by the correction coefficient Cmain. In the embodiment, the processing unit 11 realizes the function of the multiplication unit 11d. The multiplication unit 11d corrects the MAF measured value MAF_R by the correction coefficient Cmain. In the embodiment, the processing unit 11 realizes the function of the multiplication unit 11d. Specifically, the multiplication unit 11d corrects the MAF measured value MAF_R by multiplying the MAF measured value MAF_R by the correction coefficient Cmain. As a result, the corrected value of MAF_R can be obtained.

The thus obtained corrected value of the MAF measured value MAF_R is output as a MAF corrected value MAF_C from the multiplication unit 11d. Then, the processing unit 11 moves the process to step S109 to control the EGR device 6 illustrated in FIG. 1 based on the MAF corrected value MAF_C determined at step S108. For example, when determining the measured value of the EGR rate determined by the foregoing equation (1), the processing unit 11 uses the MAF corrected value MAF_C for the intake air amount (refer to the foregoing equation (2)) contained in the entire intake air amount in the equation (1).

Next, step S110 will be described. At step S110, the processing unit 11, specifically, the control condition determination unit 11a compares an absolute value of the difference $\Delta NOx$ with an absolute value of a difference threshold $\Delta NOx\_c$ as a predetermined value. In the embodiment, the difference threshold $\Delta NOx\_c$ is a constant. When $|\Delta NOx| \leq |\Delta NOx\_c|$ (step S110: Yes), the control condition determination unit 11a generates an instruction for performing step S111, that is, an instruction for updating the MAF correction map 13M (FIG. 4). After acquiring the foregoing instruction generated by the control condition determination unit 11a, the processing unit 11 moves the process to step S111. Then, the processing unit 11 updates the MAF correction map 13M (FIG. 4) by the MAF correction coefficient Cmain at the timing when $|\Delta NOx| \leq |\Delta NOx\_c|$. Specifically, the processing unit 11 replaces the map correction value Ctab corresponding to the MAF measured value MAF_R corrected by the MAF correction coefficient Cmain at the timing when $|\Delta NOx| \leq |\Delta NOx\_c|$, by the MAF correction coefficient Cmain at the timing when $|\Delta NOx| \leq |\Delta NOx\_c|$. Since the MAF correction coefficient Cmain at the timing when $|\Delta NOx| \leq |NOx\_c|$ contains the correction value Cdnox at that timing, after the update of the MAF correction map 13M (FIG. 4), the MAF correction coefficient Cmain containing the correction value Cdnox when $|\Delta NOx| \leq |\Delta NOx\_c|$ is written into the MAF correction map 13M (FIG. 4). Then, after the update, the MAF measured value MAF_R is corrected using the MAF correction coefficient Cmain containing the correction value Cdnox when $|\Delta NOx| \leq |\Delta NOx\_c|$ as map correction value Ctab.

Accordingly, after the update of the MAF correction map 13M illustrated in FIG. 4, even when the NOx measurement sensor 8 cannot be used any more, it is possible to correct the MAF measured value MAF_R using the map correction value Ctab described after the replacement in the MAF correction map 13M. As a result, it is possible to suppress occurrence of an error in the MAF measured value MAF_R, and thus it is possible to improve the accuracy of control of the EGR device 6 and reduce NOx contained in the exhaust gas Ex.

When the MAF correction map 13M is updated each time a MAF correction coefficient Cmain containing a correction value Cdnox is generated, there arises a possibility that the map correction value Ctab of the MAF correction map 13M is replaced by an inappropriate MAF correction coefficient Cmain. For example, when the diesel engine 1 is started or the NOx measurement sensor 8 cannot be used any more or the like, the MAF corrected value MAF_C corrected based on the map correction value Ctab resulting from the inappropriate MAF correction coefficient Cmain may deviate largely from the actual intake air amount.

As described above, it is possible to correct the MAF corrected value MAF_R based on the appropriate map correction value Ctab by replacing the map correction value Ctab of the MAF correction map 13M by the MAF correction coefficient Cmain at the timing when $|\Delta NOx| \leq |\Delta NOx\_c|$, and thus, the obtained MAF corrected value MAF_C is also appropriate. As a result, it is possible to appropriately control the EGR device 6 and the like with a minimum error between the MAF corrected value MAF_C and the actual intake air amount, and thus it is possible to keep NOx_contained in the exhaust gas EX of the diesel engine 1 within a regulatory limit.

When the difference threshold $\Delta NOx\_c$ is too large, NOx_contained in the exhaust gas EX of the diesel engine 1 may not be sufficiently reduced. In addition, when the difference threshold $\Delta NOx\_c$ is too small, the convergence of the control may decrease to delay the update of the MAF correction map 13M at step S111. Thus, the difference threshold $\Delta NOx\_c$ is preferably decided taking into account the reduction of NOx_contained in the exhaust gas EX and the convergence of the control. In the embodiment, the difference threshold $\Delta NOx\_c$ is set to 10 ppm, for example.

When the MAF correction map 13M is updated, it is preferred that, after the addition unit 11c outputs the MAF correction coefficient Cmain, the output of the correction value generation unit 11b is reset (to 0) before the update. Since the correction value generation unit 11b generates the correction value Cdnox using at least the integral term, unless the output of the correction value generation unit 11b is reset, an inappropriate correction value Cdnox may be generated after when $|\Delta NOx| \leq |\Delta NOx\_c|$ under influence of the integral term. In this case, the EGR device 6 and the like cannot be appropriately controlled and the MAF correction map 13M is rewritten by the inappropriate MAF correction coefficient Cmain. Thus, the output of the correction value generation unit 11b is reset to eliminate the foregoing influence of the integral term. Accordingly, it is possible to control the EGR device 6 and the like using the appropriate MAF correction coefficient Cmain. When the output of the correction value generation unit 11b is reset, at least the integral term may be reset (to 0).

When $|\Delta NOx| > |\Delta NOx\_c|$ at step S110 (step S110: No), one loop of control is terminated without update of the MAF correction map 13M. Upon completion of the one loop of control, the processing unit 11 returns to step S101 to repeat the subsequent steps. At that time, when the condition for the adaptive control is met (step S103: Yes), steps S101 to S111 are repeated. Therefore, in the embodiment, as far as the state continues in which the condition for the adaptive control is met (step S103: Yes), steps S101 to S111 are repeated until $|\Delta NOx| \leq |\Delta NOx\_c|$ holds. Specifically, the correction value Cdnox is determined and the correction of the MAF measured value MAF_R is repeated by the MAF correction coefficient Cmain containing the correction value Cdnox until $|\Delta NOx| \leq |\Delta NOx\_c|$ holds.

During operation of the diesel engine 1, the MAF measured values MAF_R of various magnitudes are corrected by the MAF correction coefficient Cmain containing the correction value Cdnox. As a result, as illustrated in FIG. 6, the map correction value Ctab (MAF correction coefficient Cmain) described in the MAF correction map 13M is replaced by an appropriate value for the MAF measured values MAF_R of various magnitudes. Accordingly, it is possible to appropriately correct the MAF measured value MAF_R under a wide variety of operating conditions of the diesel engine 1 to keep NOx_contained in the exhaust gas EX within a regulatory limit. In addition, by determining and mapping the MAF correction coefficients Cmain for the MAF measured values MAF_R of various magnitudes and storing the same in the storage unit 12, even when the NOx measurement sensor 8 does not work, it is possible to correct the MAF measured value MAF_R using correspondences between the MAF measured values MAF_R and the MAF correction coefficients Cmain.

In the foregoing description, the MAF correction map 13M is updated using the MAF correction coefficient Cmain output from the addition unit 11c. However, the update of the MAF correction map 13M is not limited to this. For example, a plurality of the MAF correction coefficients Cmain output from the addition unit 11c is accumulated in a buffer unit 12B illustrated in FIG. 3. After that, the processing unit 11 illustrated in FIG. 1 performs statistical processes such as averaging, for example, on the plurality of the accumulated MAF correction coefficients Cmain to determine the corrected value of the MAF correction coefficient Cmain (corrected MAF correction coefficient Cmain_c). Accordingly, when the corrected MAF correction coefficient Cmain_c is determined, the control condition determination unit 11a illustrated in FIG. 3 closes a switch unit 11s (turns the switch unit 11s to ON state) and outputs the corrected MAF correction coefficient Cmain_c from the buffer unit 12B to the MAF correction map 13M to update the MAF correction map 13M. Accordingly, it is possible to level out the MAF correction coefficients Cmain, and thus it is possible to reduce the possibility that the MAF correction map 13M is updated by an inappropriate MAF correction coefficient Cmain.

The foregoing buffer unit 12B may use the storage unit 12 of the control device 10 illustrated in FIG. 1. When the control condition determination unit 11a generates an instruction for updating the MAF correction map 13M, the processing unit 11 generates the corrected MAF correction coefficient Cmain_c from the plurality of MAF correction coefficients Cmain accumulated in the buffer unit 12B. Then, the buffer unit 12B uses the generated corrected MAF correction coefficient Cmain_c to update the MAF correction map 13M.

In the foregoing description, the serial process is taken as an example in which step S102 is performed and then steps S104 to S106 are sequentially performed. Alternatively, steps S104 to S106 and step S102 may be performed in parallel. In this case, when the condition for executing the adaptive control is met (step S103: Yes), step S102 is performed in parallel to steps S104 to S106.

In addition, in the foregoing description, the serial process is taken as an example in which steps S108 and S109 are sequentially performed and then steps S110 and S111 are sequentially performed. However, the present invention is not limited to this but steps S108 and S109 and step S110 and S111 may be performed in parallel after completion of step S107. In this case, there is no particular limit on the order of performing steps S108 and S109. Next, descriptions will be given as to the case where it is determined at step S103 that the condition for executing the adaptive control is not met (step S103: No).

The processing unit 11 moves the process to step S112. At step S112, the processing unit 11 sets Cdnox to 0. This is because, in the embodiment, when the condition for executing the adaptive control is not met, the correction value generation unit 11b does not generate the correction value Cdnox or outputs 0 as the correction value Cdnox at any time. Next, the processing unit 11 moves the process to step S113 to determine the MAF correction coefficient Cmain. The MAF correction coefficient Cmain is as described above, and thus descriptions of the same will be omitted.

After determining the MAF correction coefficient Cmain, the processing unit 11 moves the process to step S114. At step S114, the multiplication unit 11d illustrated in FIG. 3 corrects the MAF measured value MAF_R by the MAF correction coefficient Cmain. The correction of the MAF correction coefficient Cmain is as described above, and thus descriptions of the same will be omitted.

Next, the processing unit 11 moves the process to step S115 to control the EGR device 6 illustrated in FIG. 1 based on the MAF corrected value MAF_C determined at step S114. The control of the EGR device 6 is as described above, and thus descriptions of the same will be omitted. Upon completion of step S115, one loop of control is terminated. Thus, the processing unit 11 returns the process to step S101 to repeat the subsequent steps.

In the embodiment, steps S104 to S111 and steps S112 to S115 may be performed in parallel. For example, while the EGR device 6 and the like are controlled by performing steps S112 to S115, steps S104 to S111 are continuously performed in the background. Then, when the condition for the adaptive control is met, the process may be switched to steps S104 to S111 to control the EGR device 6 and the like.

Modification Example

Figure 7:
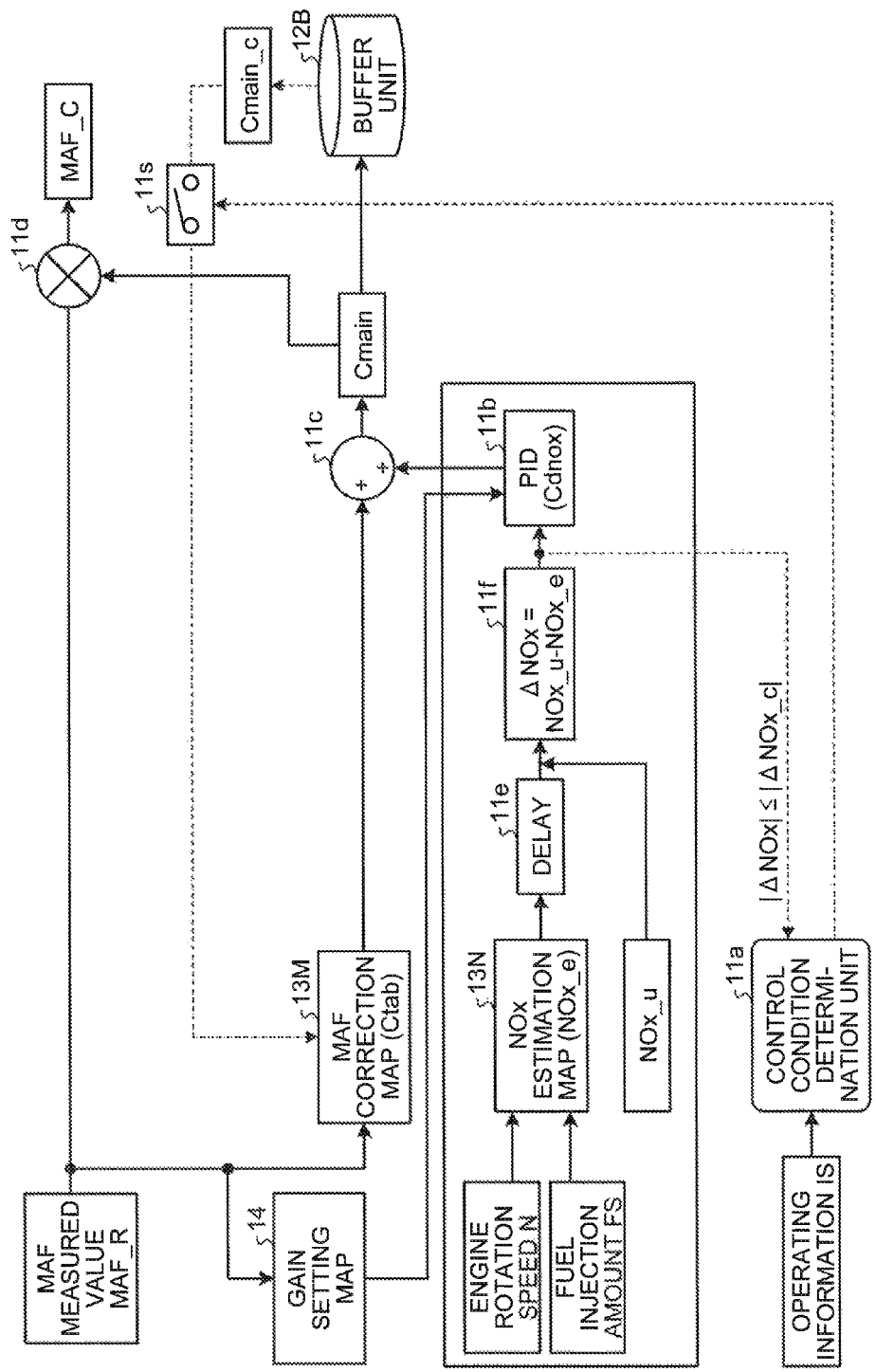
FIG. 7 is a control block diagram of a diesel engine according a modification example of the embodiment.

FIG. 7 is a control block diagram of a diesel engine according to a modification example of the embodiment. FIG. 8 is a diagram of one example of a gain setting map for use in the method for controlling the diesel engine according to the modification example of the embodiment. In the foregoing embodiment, the proportional gain kp, the integral gain ki, and the derivative gain kd are set based on the engine rotation speed N and the load (fuel injection amount FS). The modification example is different from the foregoing embodiment in that the proportional gain kp, the integral gain ki, and the derivative gain kd are set based on the MAF measured value MAF_R. In other respects, the modification example is the same as the foregoing embodiment.

As illustrated in FIG. 7, the output of the MAF measured value MAF_R is input into the correction value generation unit 11b via a gain setting map 14. As illustrated in FIG. 8, the gain setting map 14 describes MAF measured values MAF_R1, MAF_R2, and others, and corresponding proportional gains kp1, kp2, and others, integral gains ki1, ki2, and others, derivative gains kd1, kd2, and others. The gain setting map 14 is determined in advance by experiments or simulations and stored in the storage unit 12 of the control device 10 illustrated in FIG. 1.

Accordingly, the processing unit 11 gives the output of the MAF measured value MAF_R to the gain setting map 14 and acquires corresponding proportional gain kp, integral gain ki, and derivative gain kd. Then, the processing unit 11 gives the acquired proportional gain kp, integral gain ki, and derivative gain kd to the correction value generation unit 11b. Accordingly, the correction value generation unit 11b can generate the correction value Cdnox using the appropriate proportional gain kp, integral gain ki, and derivative gain kd corresponding to the MAF measured value MAF_R. As a result, the correction value generation unit 11b can generate the more appropriate correction value Cdnox.

As described above, in the embodiment and the modification example, the cause for generation of the difference ΔNOx is assumed in an error in the measurement by the MAF sensor 7, and thus the MAF correction coefficient Cmain for correcting the MAF measured value MAF_R is generated such that the difference ΔNOx becomes 0. Thus, in the embodiment and the modification example, taking note of the estimated value and the measured value of NOx_contained in the exhaust gas EX to be finally reduced, the MAF measured value MAF_R is corrected such that the difference ΔNOx between the two becomes 0. Accordingly, in the embodiment and the modification example, it is possible to suppress reduction in accuracy of the intake air amount measured by the MAF sensor 7. In addition, in the embodiment and the modification example, the EGR device 6 and the like are controlled using the MAF corrected value MAF_C obtained by correcting the MAF measured value MAF_R such that the difference ΔNOx between the two becomes 0. As a result, in the embodiment and the modification example, it is possible to improve the accuracy of control of EGR in a simple configuration to reduce the amount NOx_contained in the exhaust gas EX and keep the same within a regulatory limit. In addition, in the embodiment and the modification example, there is no need for a device to determine whether the measured value from the MAF sensor 7 is abnormal, which makes it possible to simplify the system for control of EGR.

The embodiment is not limited to the foregoing matters. In addition, the constituent elements of the foregoing embodiment include elements that readily could have been estimated by a person skilled in the art, virtually identical elements, and elements within a so-called equal range. In addition, the foregoing constituent elements can be combined as appropriate. Further, the constituent elements can be omitted, replaced, and modified in various manners without deviating from the gist of the embodiment. Moreover, there is no particular limit on apparatuses or devices to which the diesel engine and the method for controlling the same according to the embodiment are applied.

REFERENCE SIGNS LIST

1 Diesel engine
2 AIR CLEANER
3 INTAKE PIPE
4 EXHAUST PIPE
5 EXHAUST GAS PROCESSING DEVICE
6 EGR DEVICE
6P EXHAUST GAS RETURN PIPE
6V EGR VALVE
7 MAF SENSOR
8 NOx MEASUREMENT SENSOR
9 MAF SYSTEM
10 CONTROL DEVICE
11 PROCESSING UNIT
11a CONTROL CONDITION DETERMINATION UNIT
11b CORRECTION VALUE GENERATION UNIT
11c ADDITION UNIT
11d MULTIPLICATION UNIT
11e DELAY APPLICATION UNIT
11f SUBTRACTION UNIT
12 STORAGE UNIT
12B BUFFER UNIT
13M MAF CORRECTION MAP
13N NOx ESTIMATION MAP
14 GAIN SETTING MAP
21 INTAKE AIR PRESSURE SENSOR
22 INTAKE AIR TEMPERATURE SENSOR
23 ENGINE SPEED SENSOR
Ctab, Ctab1 MAP CORRECTION VALUE
Cdnox CORRECTION VALUE
Cmain MAF CORRECTION COEFFICIENT
Cmain_C CORRECTED MAF CORRECTION COEFFICIENT
MAF_C MAF CORRECTED VALUE
MAF_R, MAF_R1 MAF MEASURED VALUE
NOx_e NOx ESTIMATED VALUE
NOx_u NOx MEASURED VALUE
ΔNOx DIFFERENCE
kd DERIVATIVE GAIN
ki INTEGRAL GAIN
kp PROPORTIONAL GAIN

The invention claimed is:

1. A diesel engine, comprising:
an engine speed sensor that measures a rotation speed of the diesel engine;
an exhaust gas recirculation device that recirculates an exhaust gas emitted from the diesel engine to an intake side of the diesel engine;
an intake air amount sensor that measures an intake air amount of the diesel engine;
a NOx measurement sensor that measures NOx contained in the exhaust gas emitted from the diesel engine; and
a control device that obtains a correction value for correcting a measured value by the intake air amount sensor based on a difference between (1) first information on NOx obtained based on information on a rotation speed of the diesel engine measured by the engine speed sensor and information on a load and (2) second information on NOx measured by the NOx measurement sensor to control the exhaust gas recirculation device based on the measured value by the intake air amount sensor corrected using the correction value, wherein
the control device includes a storage unit that stores a correction map in which a correlation between the measured value and a map correction value is described,
the control device determines a correction coefficient based on the map correction value and the correction value, and sets the correction coefficient as a new correction value,
the control device corrects the measured value by the new correction value and outputs a corrected measured value corrected by the new correction value,
the control device controls the exhaust gas recirculation device based on the corrected measured value, and
the control device replaces the map correction value corresponding to the measured value corrected by the correction coefficient at a timing when the difference between the first information and the second information is equal to or less than a predetermined value, by the correction coefficient at the timing when the difference between the first information and the second information is equal to or less than the predetermined value.

2. The diesel engine according to claim 1, wherein the control device obtains the correction value until the difference reaches the predetermined value or less and repeats correction of the measured value.

3. The diesel engine according to claim 2, wherein, when the difference reaches the predetermined value or less, after a timing when the difference reaches the predetermined value or less, the control device uses the correction value at the timing when the difference reaches the predetermined value or less to correct the measured value.

4. The diesel engine according to claim 1, wherein the correction value is obtained further based on the information on the rotation speed of the diesel engine and the information on the load.

5. The diesel engine according to claim 1, wherein, at least when the diesel engine is operated in a steady state, the control device corrects the measured value based on the difference between (1) the first information on NOx obtained based on information on a rotation speed of the diesel engine measured by the engine speed sensor and information on a load and (2) the second information on NOx measured by the NOx measurement sensor.

6. A method for controlling a diesel engine including an engine speed sensor that measures a rotation speed of the diesel engine, and an intake air amount sensor that measures an intake air amount, and a storage unit that stores a correction map in which a correlation between the measured value and a map correction value is described, and an exhaust gas recirculation device that recirculates an exhaust gas to an intake side, the method comprising:
obtaining a difference between (1) first information on NOx determined based on information on a rotation speed of the diesel engine and information on a load and (2) second information on NOx contained in the exhaust gas emitted from the diesel engine;
obtaining a correction value for correcting a measured value by the intake air amount sensor based on the difference between (1) the first information on NOx determined based on information on a rotation speed of the diesel engine and information on a load and (2) the second information on NOx contained in the exhaust gas emitted from the diesel engine;
correcting the measured value by the intake air amount sensor using the correction value; and
controlling the exhaust gas recirculation device based on the corrected measured value, wherein
the obtaining the correction value determines a correction coefficient based on the map correction value and the correction value, and sets the correction coefficient as a new correction value, and corrects the measured value by the new correction value and outputs a corrected measured value corrected by the new correction value, and
the correcting the measured value controls the exhaust gas recirculation device based on the corrected measured value,
the method further comprising:
replacing the map correction value corresponding to the measured value corrected by the correction coefficient at a timing when the difference between the first information and the second information is equal to or less than a predetermined value, by the correction coefficient at the timing when the difference between the first information and the second information is equal to or less than the predetermined value.

7. The method for controlling a diesel engine according to claim 6, wherein the correction value is obtained until the difference reaches the predetermined value or less and correction of the measured value is repeated.

8. The method for controlling a diesel engine according to claim 7, wherein, when the difference reaches the predetermined value or less, after a timing when the difference reaches the predetermined value or less, the correction value at the timing when the difference reaches the predetermined value or less is used to correct the measured value.

9. The method for controlling a diesel engine according to claim 6, wherein the correction value is obtained further based on the information on the rotation speed of the diesel engine and the information on the load.

10. The method for controlling a diesel engine according to claim 6, wherein, at least when the diesel engine is operated in a steady state, the measured value is corrected based on the difference between (1) the first information on NOx determined based on information on a rotation speed of the diesel engine and information on a load and (2) the second information on NOx contained in the exhaust gas emitted from the diesel engine.

* * * * *